United States Patent [19]

Dammann

[11] Patent Number: 4,564,025
[45] Date of Patent: Jan. 14, 1986

[54] SELF-PROPELLED HARVESTER THRESHER

[75] Inventor: Johannes Dammann, Harsewinkel, Fed. Rep. of Germany

[73] Assignee: Claas OHG, Harsewinkel, Fed. Rep. of Germany

[21] Appl. No.: 586,091

[22] Filed: Mar. 5, 1984

[30] Foreign Application Priority Data

Mar. 4, 1983 [DE] Fed. Rep. of Germany ....... 3307633

[51] Int. Cl.$^4$ ................................................ A01F 7/00
[52] U.S. Cl. .................................... 130/27 R; 56/228; 56/14.6
[58] Field of Search .............. 56/14.6, 228; 130/27 R, 130/27 B, 27 H, 27 L, 27 P, 27 Q, 27 S, 27 T, 27 AB

[56] References Cited

U.S. PATENT DOCUMENTS

| 1,930,855 | 10/1933 | MacGregor | 56/228 |
| 1,936,630 | 11/1933 | Krause | 56/228 |
| 3,794,046 | 2/1974 | Muijs | 56/14.6 |
| 4,084,394 | 4/1978 | van der Lely | 56/14.6 |
| 4,458,697 | 7/1984 | James | 56/14.6 |

FOREIGN PATENT DOCUMENTS 42824 12/1981 European Pat. Off. .
1222307 9/1967 Fed. Rep. of Germany .... 130/27 R

OTHER PUBLICATIONS

European Search Report, 9/24/81.

Primary Examiner—Gene Mancene
Assistant Examiner—John G. Weiss
Attorney, Agent, or Firm—Michael J. Striker

[57] ABSTRACT

A self-propelled harvester thresher has a housing, and at least one axial threshing and separating device with a rotatable drum and a casing surrounding the latter, wherein the axial threshing and separating device is turnable between a working position in which it extends transverse to a transporting direction of the harvester thresher, and a transporting position in which it does not exceed permissible street width.

12 Claims, 3 Drawing Figures

SELF-PROPELLED HARVESTER THRESHER

BACKGROUND OF THE INVENTION

The present invention relates to a self-propelled harvester thresher. More particularly, it relates to a harvester thresher with at least one axial threshing and separating device permanently connected with the harvester thresher and extending in a housing transverse to a traveling direction.

Harvester threshers of the above-mentioned general type are known in the art. The axial threshing and separating device of a known harvester thresher includes a rotatable threshing drum and an associated casing which surrounds the rotatable drum with a small play and is subdivided into a threshing basket and a sieve. The casing is provided in the region of the threshing basket with a product supply opening and at its other end with a product discharge opening. One of the known harvester threshers is disclosed in the German Auslegeschrift No. 1,222,307 in which the threshing and separating device operates in accordance with the axial flow system. The axial threshing and separating unit is formed as a double cone with oppositely directed tenicity, and the product is supplied at the lowest point of the unit. The width of this unit corresponds approximately to the width of a self-propelled harvester thresher, so that it can be mounted on the latter. Because of the small construction, only a limited though-put is possible. For avoiding this disadvantage, and attaining a higher throughput another harvester thresher is proposed in the European patent application No. 0,042,824, in which an axial threshing and separating unit is formed as an independent structural unit arranged prior to the driving axle in the inclined conveyor and the cutting mechanism, wherein the width of the axial threshing and separating mechanism considerably exceeds the machine width. In addition to the above obtained advantage of a higher throughput, this machine possesses the disadvantage that the axial threshing and separating mechanism must be dismounted for street transportation on special cars provided for this purpose. Also, the thus equipped harvester thresher is nose-heavy because of the high weight provided before the driving axle.

SUMMARY OF THE INVENTION

Accordingly, it is an object of the present invention to provide a harvester thresher which avoids the disadvantages of the prior art.

More particularly, it is an object of the present invention to provide a harvester thresher in which a high throughput can be attained, on the one hand, and it does not have to be converted for the street transportation, on the other hand.

In keeping with these objects and with others which will become apparent hereinafter, one feature of the present invention resides, briefly stated, in a self-propelled harvester thresher in which at least two axial threshing and separating devices are arranged so that they are movable between a working position in which they extend transverse to the travelling direction of the harvester thresher, and a transporting position in which they do not exceed the permissible street width.

The axial threshing and separating devices can, advantageously be arranged coaxially with one another in their working position and formed turnable from their working position in which they extend transverse to the travelling direction to a transporting position in which they extend along the travelling direction.

In accordance with another advantageous feature of the present invention, the axial threshing and separating devices are formed turnable in a horizontal plane.

For attaining a maximum compact construction, the axial threshing and separating devices in accordance with still another feature of the invention are turnable about a common axis.

A further feature of the present invention is that product supply openings provided in casings which surround rotors of axial threshing and separating devices are arranged in the working position close to one another, and a product stream separating member is located in the region the central separating point therebetween. The separating member can be formed as a rotatable disc cutter pair.

Still a further feature of the present invention is that the axial threshing and separating devices are turnable independently from one another, so that when needed only one unit can operate.

An additional feature of the present invention is that a third stationary threshing and separating unit is provided between both turnable axial threshing and separating devices.

When the axial threshing and separating devices are arranged in the rear part of the harvester thresher as proposed in accordance with the present invention, no other structural parts of the harvester thresher interfere with turning movement of the devices.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENT

Figure 1:
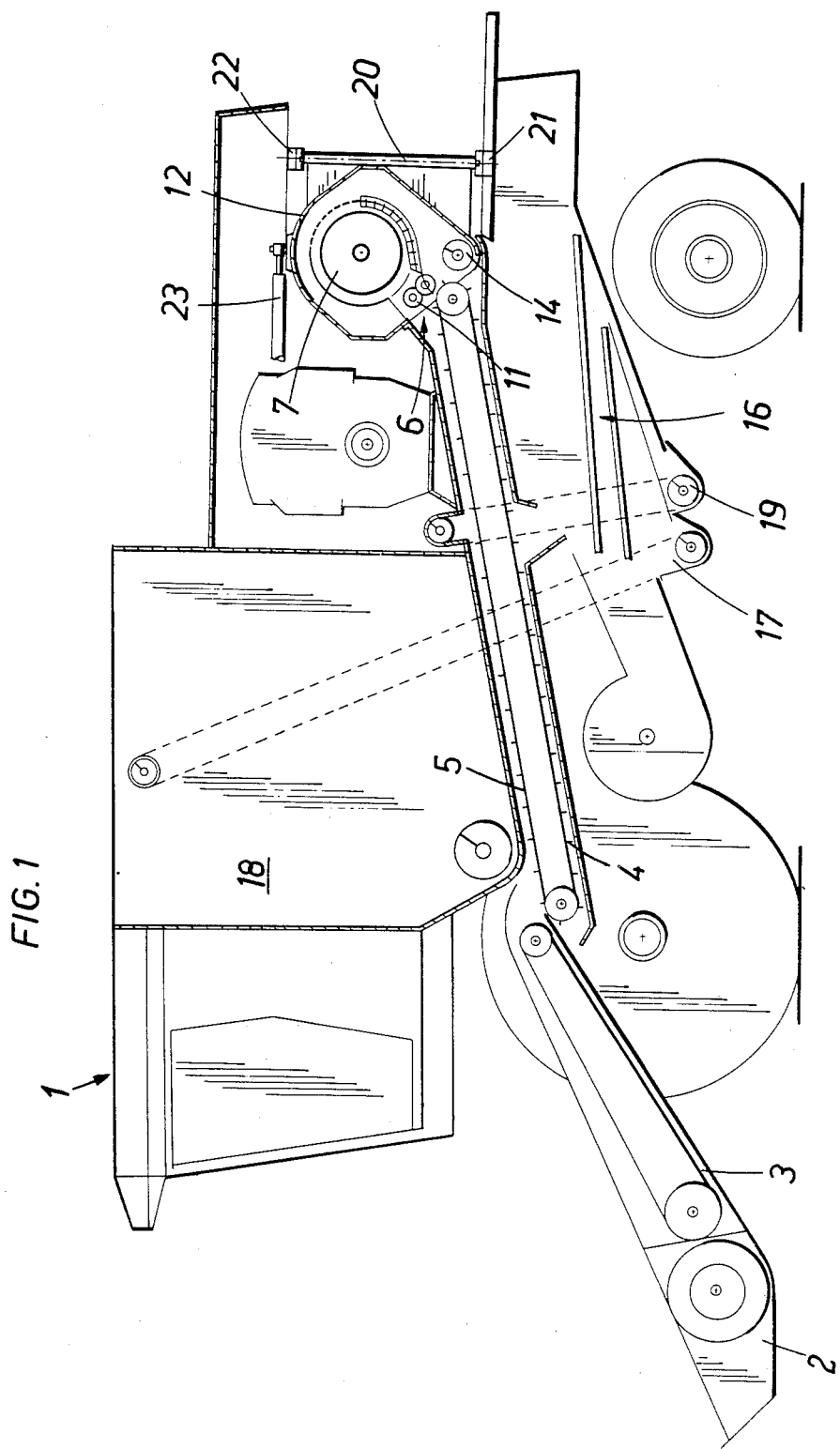
FIG. 1 is a side view in a section of a self-propelled harvester thresher in accordance with the present invention.

A self-propelled harvester thresher in accordance with the present invention is identified as a whole with reference numeral 1. It has a cutting trough 2 and an inclined conveyor 3 which follows the cutting trough. The inclined conveyor 3 guides the threshed product to a conveyor band 5. The conveyor band 5 has strips 4 and supplies the product to product supply openings 6 of two axial threshing and separating devices 7 and 8. The axial threshing and separating devices are formed in a known manner and provided at their outer end with product discharge openings 9 and 10. The threshed product is thrown through the product discharge openings 9 and 10 onto the field.

Figure 3:
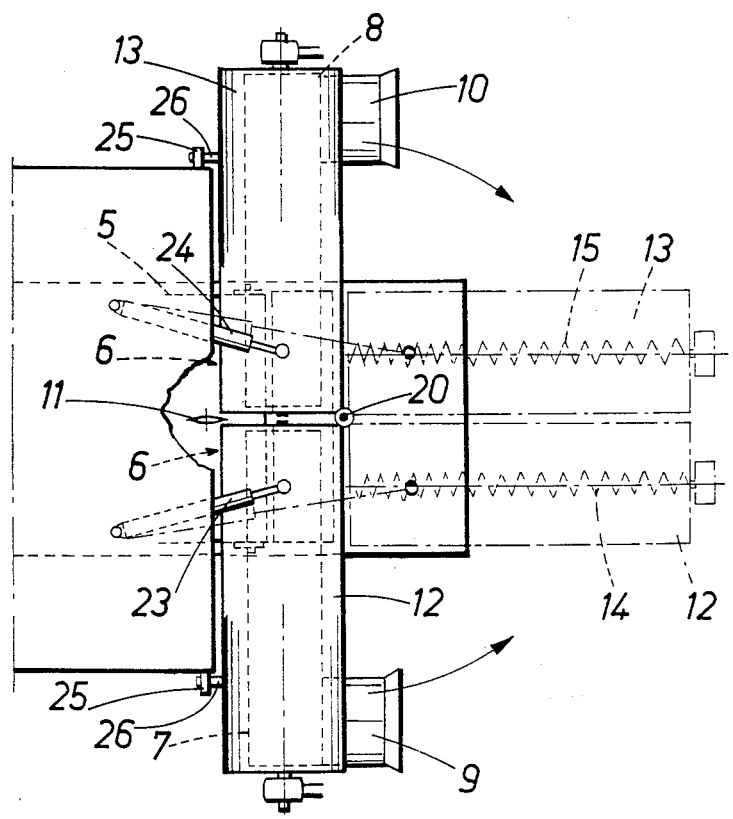
FIG. 3 is a plan view of the rear part of the harvester thresher shown in FIG. 2.

As can be seen from FIGS. 1 and 3, a known separating cutter pair 11 is provided for subdividing the product stream transported from the conveyor band into two partial streams. These partial streams are threshed in the axial threshing and separating devices 7 and 8. The axial threshing and separating devices 7 and 8 are provided with housings 12 and 13 which surround them. Grain mixed with chaff falls into the housings 12 and 13 of the axial threshing and separating devices 7 and 8. Then it is collected by screws 14 and 15 and supplied to a wind sieve device 16. The cleaned grain is transported by an elevator 17 into a grain tank 18. Not completely cleaned grain is transported via a transfer 19 back to the transporting band 5. The housings 12 and 13 which surround both axial threshing and separating devices are supported on a common vertical axle 20 of both devices. The axle 20 is fixedly connected via traverses 21 and 22 with the harvester thresher.

Figure 2:
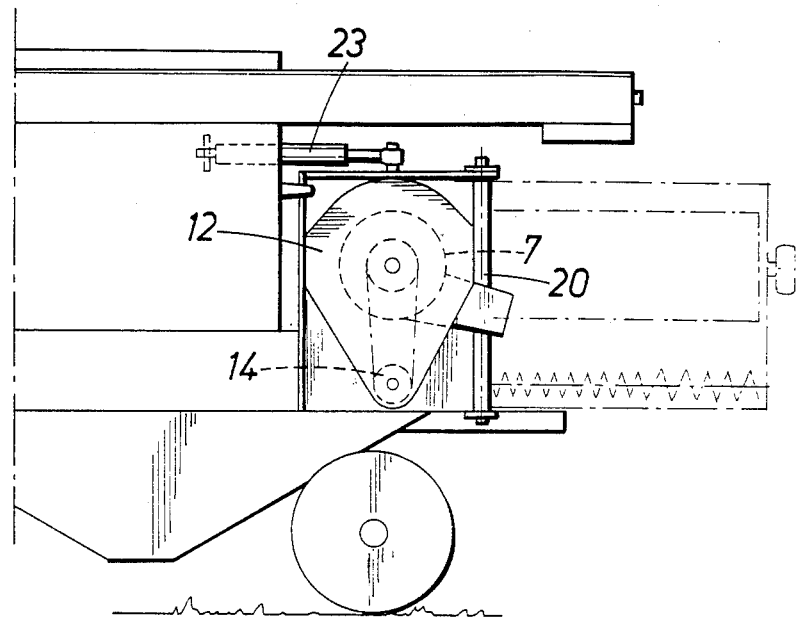
FIG. 2 is a side view of the rear part of harvester thresher in accordance with the present invention.

Cylinder-piston unit 23 and 24 are further provided. The threshing and separating units 7 and 8 can be turned by the cylinder and piston units 23 and 24 around the axle 20 from the position shown in FIGS. 2 and 3 in solid lines to the transporting position shown in dashed-dot lines. In this transporting position the axial threshing and separating units are arranged so that they do not exceed the width permissible for the street transportation. In their end positions the turnable axial threshing and separating devices 7 and 8 are additionally locked with the aid of two connectable locking parts 25 and 26 with the fixed machine frame. In FIG. 3 of the drawing the locking is shown in the operating position of the axial threshing and separating units 7 and 8.

It will be understood that each of the elements described above, or two or more together, may also find a useful application in other types of constructions differing from the types described above.

While the invention has been illustrated and described as embodied in a self-propelled harvester thresher, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A self-propelled harvester thresher, comprising a housing; at least two non-removable axial threshing and separating devices arranged in said housing and each including a rotatable threshing drum and a casing surrounding the latter with a small distance therebetween and provided with a product supply opening and a product discharge opening, said axial threshing and separating devices being non-removably movable between two positions including a working position in which said axial threshing and separating devices extend transverse to a longitudinal axis of the harvester thresher, and a transporting position in whcih said axial threshing and separating devices extend along the longitudinal axis of the harvester thresher so that they do not exceed a permissible street width.

2. A self-propelled harvester thresher as defined in claim 1, wherein said casing includes a threshing basket and a sieve, said casing having one end provided with said threshing basket in which said product supply opening is formed, and another end in which said product discharge opening is formed.

3. A self-propelled harvester thresher as defined in claim 1, wherein said axial threshing and separating devices are turnable in a horizontal plane.

4. A self-propelled harvester thresher as defined in claim 1, wherein said axial threshing and separating devices are turnable about a common axis.

5. A self-propelled harvester thresher as defined in claim 1, wherein said axial threshing and separating devices are arranged so that said product supply openings are located close to one another.

6. A self-propelled harvester thresher as defined in claim 5; and further comprising a product stream separating member located upstream of said product supply openings, said product stream separating member being formed as a separating cutter pair.

7. A self-propelled harvester thresher as defined in claim 1, wherein said axial threshing and separating devices are turnable independently from one another.

8. A self-propelled harvester thresher, comprising a housing; at least two non-removable axial threshing and separating devices arranged in said housing and each including a rotatable threshing drum and a casing surrounding the latter with a small distance, therebetween and provided with a product supply opening and a product discharge opening, said axial threshing and separating devices being movable between two positions including a working position in which said axial threshing and separating devices extend transverse to the travelling direction of the harvester thresher, and a transporting position in which said threshing and separating devices extend so that they do not exceed a permissible street width, said axial threshing and separating devices being arranged in said working position coaxially to one another, and for assuming said transporting position being turnable from said working position to said transporting position.

9. A self-propelled harvester thresher as defined in claim 8, wherein in said transporting position said both axial threshing and separating devices extend along said travelling direction of the harvester thresher.

10. A self propelled harvester thresher, comprising a housing, at least two non-removable axial threshing and separating devices arranged in said housing and each including a rotatable threshing drum and a casing surrounding the latter with a small distance therebetween and provided with a product supply opening and a product discharge opening, said axial threshing and separating devices being turnable about a common axis between two positions including a working position in which said axial threshing and separating devices extend transverse to the travelling direction of the harvester thresher, and a transporting position in which said axial threshing and separating devices extend so that they do not exceed a permissible street width; and a vertical axle defining said common axis about which said both axial threshing and separating devices are turnable.

11. A self-propelled harvester thresher, comprising a housing; at least two non-removable axial threshing and separating devices arranged in said housing and each including a rotatable threshing drum and a casing surrounding the latter with a small distance therebetween and provided with a product supply opening and a product discharge opening, said axial threshing and separating devices being movable between two positions including a working position in which said axial threshing and separating devices extend transverse to a longitudinal axis of the harvester thresher, and a transporting position in which said axial threshing and separating devices extend along the longitudinal axis of the harvester thresher so that they do not exceed a permissible street width, said harvester thresher having a rear region, and said axial threshing and separating devices being arranged in said rear region of said harvester thresher.

12. A self-propelled harvester thresher, comprising a housing having a longitudinal axis; at least two non-removable axial threshing and separating devices arranged in said housing and each including a rotatable threshing drum and a casing surrounding the latter with a small distance therebetween and provided with a product supply opening and a product discharge opening, said axial threshing and separating devices being non-removably movable between two positions including a working position in which said axial threshing and separating devices extend transverse to the travelling direction of the harvester thresher, and a transporting position in which said axial threshing and separating devices extend parallel to one another so that they do not exceed a permissible street width, said axial threshing and separating devices extending in said transporting position parallel to said longitudinal axis.

* * * * *